United States Patent [19]
Rupp

[11] 3,902,277
[45] Sept. 2, 1975

[54] METHOD AND APPARATUS FOR GENERATING TORIC SURFACES BY THE USE OF A PERIPHERAL SURFACING TOOL

[75] Inventor: Wiktor J. Rupp, Lowell, Mass.

[73] Assignee: Itek Corporation, Lexington, Mass.

[22] Filed: Apr. 1, 1974

[21] Appl. No.: 456,936

[52] U.S. Cl. .................. 51/33 W; 51/284; 51/96
[51] Int. Cl. ............................................. B24b 13/00
[58] Field of Search ............ 51/33 R, 33 W, 55, 90, 51/96, 119, 120, 124 L, 284

[56] References Cited
UNITED STATES PATENTS

| | | | |
|---|---|---|---|
| 2,352,146 | 6/1944 | Desenberg | 51/55 |
| 2,352,753 | 7/1944 | Anderson | 51/90 |
| 2,633,675 | 4/1953 | Ellis | 51/33 R |
| 2,766,559 | 10/1956 | Pixley | 51/33 W |
| 3,030,739 | 4/1962 | Folley | 51/33 R |
| 3,382,624 | 5/1968 | Folley | 51/105 R |
| 3,492,764 | 2/1970 | Dalton | 51/124 L |

*Primary Examiner*—Al Lawrence Smith
*Assistant Examiner*—K. J. Ramsey
*Attorney, Agent, or Firm*—Homer O. Blair; Robert L. Nathans; Gerald H. Glanzman

[57] ABSTRACT

Method and apparatus for generating toric surfaces of varying curvature by the use of a single peripheral grinding tool. The toric surface is generated by sweeping the tool across a workpiece along a first curved path having a radius equal to the radius of the curvature to be generated in the direction of one major meridian of the workpiece surface while simultaneously oscillating the workpiece relative to the tool along a second curved path perpendicular to the first curved path and having a radius equal to the radius of the curvature to be generated in the direction of the second major meridian of said toric surface. In the presently preferred embodiment, the relative movement between the tool and workpiece along the second curved path is conveniently accomplished by mounting the workpiece to an adjustable parallelogram support mechanism designed to orbitally oscillate the workpiece in the plane of the second curved path. The system permits either curvature to be independently controlled to enable an entire series of toric surfaces to be generated with the same peripheral tool. The system is especially designed for generating toric concave surfaces on ophthalmic lenses and this is particularly suitable for use in wholesale prescription laboratories.

11 Claims, 2 Drawing Figures

METHOD AND APPARATUS FOR GENERATING TORIC SURFACES BY THE USE OF A PERIPHERAL SURFACING TOOL

BACKGROUND OF THE INVENTION

1. Field of the Invention

The present invention relates generally to a method and apparatus for generating toric surfaces. More specifically, the present invention relates to a method and apparatus for generating toric surfaces of varying curvature on ophthalmic lenses in an efficient one-step operation by the use of a peripheral grinding tool.

2. Description of the Prior Art

A toric surface is a surface of compound curvature in which the curvature measured in the direction of a first major meridian of the surface is of a different radial dimension than when measured in the direction of a second major meridian normal to and passing through the first major meridian. Such surfaces are useful in many fields but are particularly important in the ophthalmic field wherein lenses having toric surfaces are used to correct vision defects such as astigmatism. Because of their importance in the ophthalmic field, a variety of techniques have been developed for generating such surfaces on lenses. For example, one common technique is to generate the surface with a tool having an abrading face that is precisely pre-formed to the particular toric shape desired on the lens. By appropriately moving such a tool relative to the lens surface, the surface will gradually assume the toric shape of the abrading face. Although such a procedure will produce a reasonably accurate toric surface, it is not a fully satisfactory technique for several reasons. For one thing, in the ophthalmic field it is necessary to provide lenses having a large number of different toric curvatures in order to adequately satisfy the prescription requirements of all patients, and, since each tool is pre-formed to generate only a single surface shape, it becomes necessary to stock, service, recondition and replace large numbers of differently shaped tools. This obviously results in a significant expense and a substantial inconvenience. Furthermore, this technique is quite slow and, as a result, a relatively large number of machines are needed to produce and maintain an adequate supply of lenses.

Because of the inadequacies in the above technique, a second type of surfacing procedure has been developed utilizing a so-called "universal" or cup-shaped generating tool with which toric surfaces of different curvature can be generated utilizing a single tool. (Examples of this technique are described in U.S. Pat. Nos. 2,633,675 and 3,492,764). These tools, however, are still not fully satisfactory because they tend to introduce elliptical errors into the lens (i.e., a flattening out of the lens surface in peripheral areas) as well as other surface irregularities which are not acceptable. Although attempts have been made to overcome these deficiencies by moving the lens and tool relative to one another in complex paths involving several movements superimposed on one another, these necessitate complex machinery that are quite expensive and require careful monitoring and adjustment.

A further type of system for generating toric surfaces is described in copending U.S. patent application Ser. No. 385,213 filed on Aug. 2, 1973, by the Applicant of the instant application and entitled METHOD AND APPARATUS FOR GENERATING TOROIDAL SURFACES. In this system, a toric surface is generated by sweeping a disc-shaped or peripheral tool across the surface of the lens blank in a curved path such that radius of the curvature generated on the lens blank in the direction of the sweep will equal the radius of the curved path while the radius of the curvature generated on the lens blank in the direction perpendicular to the direction of sweep will substantially equal the radius of the tool itself. In this system, the curvature of the lens in the direction of the sweep can be varied by simply varying the radius of the sweep path, however, the radius of curvature of the lens in the direction perpendicular to the sweep direction cannot be varied to any significant extent without changing the tool itself. Thus, although this system does provide a relatively simple system for generating toric surfaces and is generally acceptable in mass production operations wherein large numbers of identical lenses are surfaced, it is not fully satisfactory for wholesale laboratory use wherein lenses are ground to prescription, and each lens might require a different curvature because in such an application it would still be necessary to maintain an inventory of different sized tools together with either frequent tool changes or a large number of different machines.

SUMMARY OF A PREFERRED EMBODIMENT OF THE INVENTION

In accordance with a preferred embodiment of the present invention, many of the inadequacies inherent in the above-described techniques have been significantly reduced by providing a system for generating toric surfaces of widely differing curvature by the use of a single peripheral tool. In particular, the preferred system provided incorporates structure similar to that described in the above-referred to U.S. patent application Ser. No. 385,213 modified to include additional structure for oscillating the tool and the lens blank relative to one another along a second curved path perpendicular to the sweeping path so as to permit control over both of the curvatures to be generated on the lens surface without changing the tool. Thus, with the present system the curvature generated on the lens in the direction of one major meridian (usually the larger radius, base curve) will be a function of the radius of the curved path along which the tool and lens blank are swept across one another while the curvature generated on the lens in the direction of the second major meridian (usually the shorter radius, cylinder curve) will be a function of the radius of the path of oscillation. By merely changing the radius of either or both curved paths, it becomes a relatively simple matter to generate lens surfaces of any desired curvature with the same tool. The specific structure for oscillating the tool and lens relative to one another can take several forms but in the presently preferred embodiment it comprises a parallelogram support mechanism having the lens blank mounted on one arm thereof, together with means for reciprocating the arm of the parallelogram so as to cause the lens blank to move in an orbital manner relative to the tool. By merely adjusting the length of the links coupling the arm to the base of the parallelogram, the radius of the curved path can be changed as desired.

In general, the system provided is quite simple in design and yet is capable of grinding large numbers of lenses of differing curvature with only minor adjustment. Further advantages and features of the invention will be set forth hereinafter.

DETAILED DESCRIPTION OF THE PREFERRED EMBODIMENT OF THE INVENTION

Figure 1:
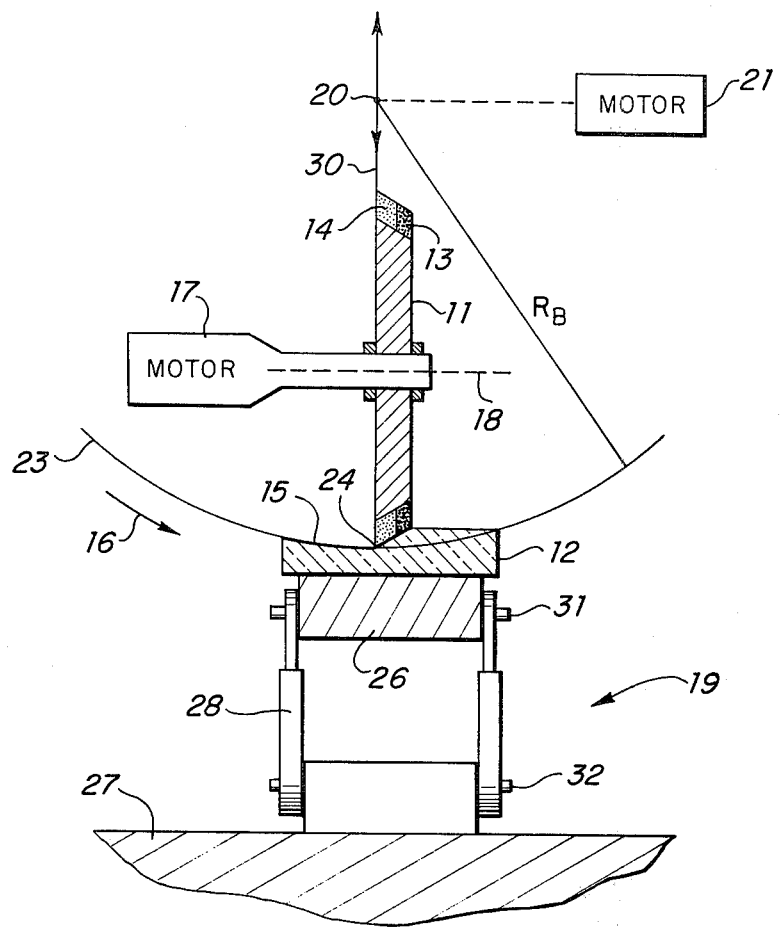
FIG. 1 illustrates, somewhat schematically, a cross-sectional top view of a toric surface generating apparatus in accordance with a presently preferred embodiment of the invention looking in the direction of arrows 1—1 in FIG. 2.
Figure 2:
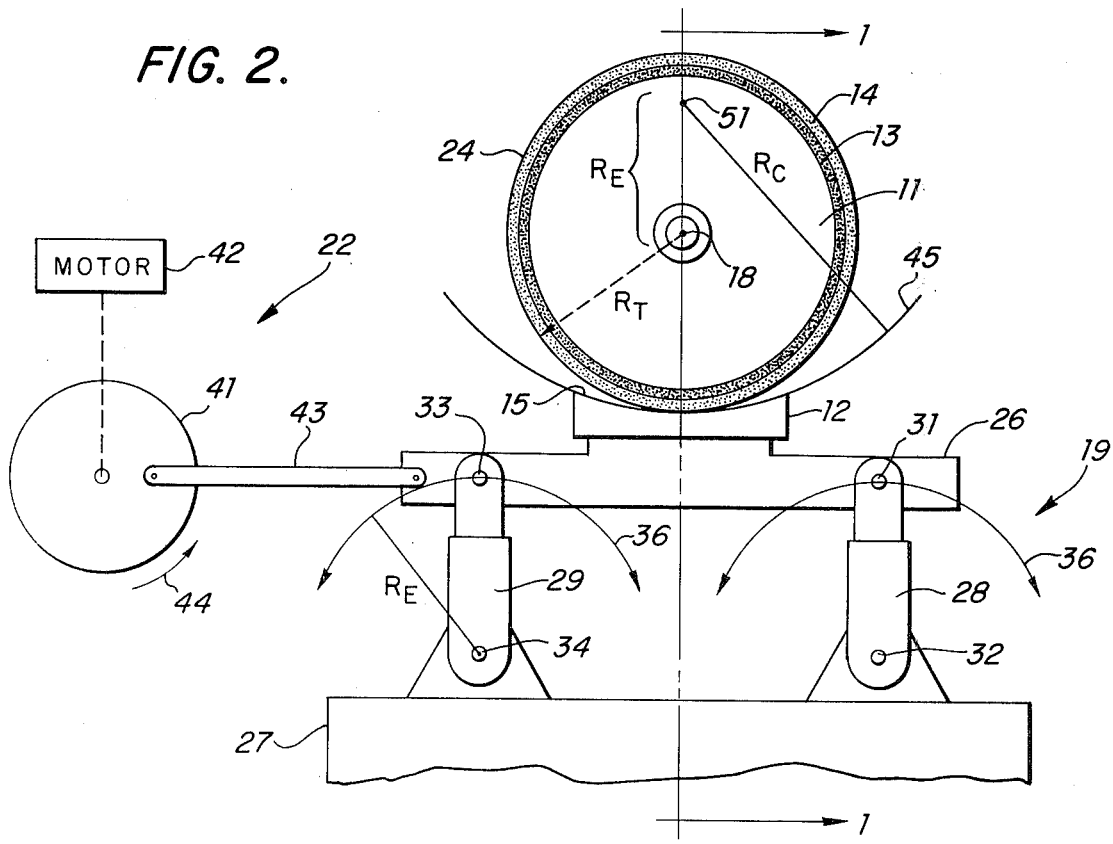
FIG. 2 illustrates a somewhat schematic side view of the toric surface generating apparatus of FIG. 1.

FIGS. 1 and 2 illustrate, somewhat schematically, a cross-sectional top and a side view, respectively, of an apparatus for generating toric surfaces on lenses in accordance with a presently preferred embodiment of the invention.

The apparatus generally includes a circular, disc-shaped grinding tool 11 (hereinafter referred to as a peripheral tool) around the periphery of which is secured suitable abrasive materials for grinding a lens blank 12 to be carried thereacross in a prescribed manner. The abrasive materials, which may consist of bonded diamond particles or the like, are preferably provided in two grit sizes so as to enable both rough and fine grinding operations to be performed on the lens simultaneously in the surfacing operation. More specifically, the tool is preferably provided with a rough grinding abrasive portion 13 having a grit size of between about 100 to 180 mesh particles and a fine grinding abrasive portion 14 having a grit size of between about 400 to 600 mesh particles depending upon the type of glass or plastic being ground and upon the polishing requirements. It should be emphasized, however, that it is not intended to limit the invention to a double grit tool. If desired, a single grit tool as well as a tool having more than two grit sizes may also be employed without departing from the scope of the invention.

With the tool constructed and oriented in the manner illustrated in FIGS. 1 and 2, when the abrasive surface of the peripheral tool 11 is carried across the surface of lens blank 12 in the direction indicated by arrow 16, the blank will initially encounter rough grinding portion 13 which will roughly reduce the lens blank 12 to the curvature desired and will immediately thereafter encounter fine grinding portion 14 which will remove any imperfections in the lens surface introduced by the rough grinding operation. Following one sweep of the lens blank across the tool in this manner, the lens will generally be in condition for immediate polishing.

The peripheral tool 11 is adapted to be rapidly rotated at, for example, 4,000 to 7,000 rpm, by means of a motor 17 axially coupled thereto. Motor 17 is itself appropriately mounted to suitable support structure which has not been illustrated for purposes of clarity, but which may, if desired, incorporate the x-y table structure described in the abovementioned U.S. patent application Ser. No. 385,213 provided for the purpose of compensating for tool wear.

The lens blank 12, upon which the toric concave surface 15 is to be applied, is mounted to a parallelogram-type support structure generally designated by the reference number 19 designed to permit the lens blank and tool to be moved relative to one another in a manner to cause the desired toric surface to be generated on the lens as will be explained in greater detail hereinafter.

The manner in which the apparatus generally described above can be effectively utilized to generate toric surfaces of varying curvature on lens blank 12 will now be explained in detail.

Initially, let it be assumed that peripheral tool 11 has an effective radius of $R_T$ which will generally be the maximum radial dimension of the tool as measured from the tool axis 18 to the outermost extremity 24 of the tool periphery. The term "effective radius" is used herein, however, because it is possible to adjust the tool as described in previously mentioned U.S. patent application Ser. No. 385,213 so it will present to the lens blank surface a radius slightly larger than its actual radius. This adjustment capability will not be discussed hereinafter in describing the orientation between the tool and the lens blank, but it should be understood that the adjusted tool orientation could be employed if desired. Also, let it be assumed that by using the tool 11 of effective radius $R_T$, we wish to generate a toric surface on lens blank 12 having a base curvature of radius $R_B$ (e.g., the curvature visible in FIG. 1) and a cross curvature of radius $R_C$ (e.g., the curvature visible in FIG. 2).

Curvature $R_B$ can readily be generated on the lens blank by sweeping the tool and the lens blank relative to one another along a curved path 23 having the desired radius $R_B$ as illustrated in FIG. 1 such that the tool will intersect the lens blank and in doing so generate the curvature $R_B$ on surface 15. More particularly, the tool 11 is oriented relative to the curved path 23 and relative to lens blank 12 such that the tool axis 18 will be perpendicular to a radial line 30 drawn from the center of curvature 20 of the path 23 to the line of contact 24 between the lens blank and the maximum radial extremity of the tool. Put another way, the tool is oriented to be perpendicular to a tangent to the curve 23 at a point where the maximum radial dimension of the tool touches the curve. By orienting the peripheral tool relative to the path 23 and to lens blank 12 in this manner, when the lens blank and the tool are swept relative to one another along the path 23 in the direction of arrow 16 by means of a suitable motor 21, the tool will generate a curvature on the lens blank 12 in the direction of the sweep having a radius equal to the radius of curved path 23. By properly positioning the center of curvature 20 relative to lens blank 12, curved path 23 can be given the desired radius $R_B$ to generate the proper base curve on the lens blank. By moving center of curvature 20 up or down line 30 as indicated by the arrows, other base curves can also readily be generated with the same tool 11. It should also be emphasized at this point that it is immaterial whether the lens is swept across the tool or the tool is swept across the lens since only the relative movement is significant. Thus, motor 21 is only schematically shown as being mechanically coupled to center of curvature 20. The actual driving structure may take any one of many well known forms.

With reference now to FIG. 2, it should be apparent that as the tool and lens blank are swept across one another to generate curvature $R_B$, the tool will simultaneously generate a second curvature on the lens blank in the direction perpendicular to curvature $R_B$ which, in the absence of any other relative movements, will have a radius equal to $R_T$, the effective radius of the tool itself. In other words, it is the effective radius of the tool itself which will determine the lens curvature in the direction perpendicular to the direction of sweep. Accordingly, in the absence of additional structure, to generate cross curvatures of different radii it would be necessary to use different sized tools and this is an undesirable condition because it makes large tool inventories necessary and also requires that the tools either be frequently replaced on a machine or that a large number of machines be maintained. This condition is especially undesirable in prescription laboratories wherein lenses are ground to satisfy the prescription requirements of individual patients and thus will generally vary considerably.

The present invention has been designed to overcome this deficiency by enabling cross curvatures of different radii to be generated without changing the tool. Basically, this has been accomplished by incorporating into the system a second movement of the tool relative to the lens in addition to the above-described sweeping movement. Specifically, structure is provided to cause the tool and the lens to be oscillated relative to one another along a second curved path 45 having a radius which is equal to the radius of the desired cross curvature to be generated on the lens surface 15. By introducing this additional oscillatory motion as the tool is being swept across the lens to generate the base curvature $R_B$, it will be simultaneously caused to generate the desired cross curvature $R_C$ thereon.

A preferred system for obtaining this additional motion without requiring complex kinematics is illustrated in FIGS. 1 and 2. Specifically, in FIGS. 1 and 2, lens blank 12 is mounted to a parallelogram-type support mechanism generally designated by reference number 19. This parallelogram support 19 comprises a movable support arm or plate 26 upon which the lens blank 12 is supported and firmly held by any conventional adhesive medium such as low melting point alloy, pitch or cement or by any other suitable holding structure. Support plate 26 is, in turn, coupled to a rigid base 27 by means of a pair of parallel linkage members 28 and 29 which are coupled to both plate 26 and base 27 by pin joints 31, 32, 33 and 34 so as to permit the plate 26 to be freely reciprocated relative to base 27 as will be explained hereinafter. With this type of parallelogram construction, plate 26 can be moved between a position substantially adjacent base 27 to a position spaced therefrom by a distance determined by the length of links 28 and 29, however, in this movement every possible position of plate 26 will always be parallel to every other position. Furthermore, linkages 28 and 29 will always be parallel to one another and will move in unison. From this it should be apparent that inasmuch as pin joints 32 and 34 (FIG. 2) cannot move since they are coupled to rigid base 27, reciprocation of plate 26 will cause pin joints 31 and 33 to move back and forth along curved paths 36 having a radius equal to $R_E$, the distance between pin joints 31 and 32 or 33 and 34. Furthermore, since plate 26 and lens blank 12 rigidly mounted thereto will move with pin joints 31 and 33, every point on the plate and every point on the lens blank will likewise move in a curved path of similar radius $R_E$. Thus, by merely reciprocating plate 26 back and forth by a suitable mechanism 22, every point on lens blank 12 will be caused to oscillate back and forth relative to tool 11 along a curved path of radius $R_E$ in a non-rotating orbital manner. The effect of introducing this oscillating orbital motion to the lens blank 12 is to cause the sweeping tool 11 to generate a cross curve $R_C$ on surface 15 that is equal to the effective radius of the tool $R_T$ plus the radius of orbital path $R_E$. In other words, the generated cross curve $R_C = R_T + R_E$ where $R_T$ equals the effective radius of the tool and $R_E$ equals the effective length of linkages 28 and 29. Put yet another way, the orbital oscillating motion will cause the lens blank to move back and forth along a curved path 45 having a center of curvature at 51 which is displaced from the tool axis 18 by a distance of $R_E$ such that the radius of curved path 45 will equal $R_T + R_E$.

To generate different cross curves with the same tool, it is only necessary to change $R_E$ and this can be done merely by changing the length of linkages 28 and 29. Preferably, this is done by utilizing linkages capable of being lengthened or shortened telescopically as illustrated or by some other automated technique that does not require actual insertion and removal of different sized linkages.

Mechanism 22 for oscillating plate 26 can also take many forms. The presently preferred system illustrated utilizes a disc 41 rotatable by a motor 42 and having an eccentrically mounted connecting rod 43 pivotally coupling it to plate 26. When disc 41 is rotated about its axis, for example, in the direction of arrow 44, rod 43 will cause plate 26 to move back and forth relative to support base 27.

From the above, it should be apparent that by the system of the present invention, toric surfaces of essentially any desired curvature may readily be generated on lens blank 12 utilizing only a single peripheral tool 11. To control the base curvature of the lens it is only necessary to adjust the position of center of curvature 20 (FIG. 1) to change the radius of sweep path 23, while to control the cross curve, it is only necessary to change the length of linkages 28 and 29. Either adjustment may be made independent of the other.

The effective radius of the tool itself will determine the smallest radius cross curvature obtainable with the system while larger radii curvatures will be obtained by adjusting the size of linkages 28 and 29. Although it is only necessary to provide one tool to generate all desired cross curves, it is preferable to use at least two different sized tools to cover a complete range of curvatures because the system tends to become somewhat awkward when the linkages get too long. For example, a tool having an effective radius of about 1.8 inches can be used to generate all cross curvatures from about 5 diopters to about 11 diopters while a second tool having a radius of about 3.2 inches can be used to generate all cross curvatures from about 2 diopters to about 6 diopters.

In a preferred embodiment of the system, the tool is swept across a lens at a speed to cover a 3-inch lens in one or two minutes. Simultaneously, the tool and lens blank will be orbitally oscillated at the rate of about 200 to 300 cycles per minute. The tool itself will be rapidly rotated at about 4,000 to 7,000 rpm. It should be understood, however, that these parameters can be varied within wide limits as recognized by those skilled in the art and depend on many factors such as the lens material, the abrasive material, the polishing requirements and the like.

Although the system described above has been primarily designed to permit lenses of varying cross curvature to be obtained without changing peripheral tools, it could also have other applications. For example, it could also be used to maintain a constant cross curvature notwithstanding a reduction in the tool radius due to wear. In such an application, the linkage length $R_L$ would be increased to compensate for a reduction in $R_T$ so that $R_C$ will remain constant.

In conclusion, the present invention provides a novel system for generating toric surfaces of varying curvature utilizing a single peripheral tool. The system is quite simple in construction and avoids the relatively complex kinematics frequently proposed in the art to generate such surfaces. While what has been described above is a presently preferred embodiment of the invention, it should be understood that it may also take a variety of other forms. For example, orbital motion devices other than the parallelogram mechanism described could also be used to introduce the necessary orbital oscillating movement of the lens blank relative to the tool. Further, other types of mechanisms could readily be used to oscillate the parallelogram if desired. Because many additions, alterations and modifications may be made to the present invention without departing from the spirit thereof, it should be limited only insofar as required by the scope of the following claims.

What is claimed is:

1. Apparatus for generating a toric surface on a lens comprising:
   a. means for supporting a lens upon which said toric surface is to be generated, said toric surface having a first curvature in the direction of a first major meridian thereof and a second curvature in the direction of a second major meridian thereof normal to and passing through said first major meridian;
   b. means for supporting a peripheral surfacing tool adjacent said workpiece for generating said toric surface thereupon, said peripheral surfacing tool having a central tool axis, and a substantially annular peripheral surfacing face symmetrical about said tool axis;
   c. first drive means for transversely sweeping said tool and said lens relative to one another along a first curved path having a radius substantially equal to the radius of the curvature to be generated in the direction of said first major meridian of said toric surface for generating said first curvature thereon;
   d. second drive means for transversely oscillating said tool and said lens relative to one another along a second curved path perpendicular to said first curved path and having a radius substantially equal to the radius of the curvature to be generated in the direction of said second major meridian of said toric surface for generating said second curvature thereon, said second drive means including means coupled to said lens support means for oscillating said lens in an orbital manner relative to said tool; and,
   e. third drive means for rotating said tool about said axis thereof.

2. Apparatus as recited in claim 1 wherein the radius of said first curvature is greater than the radius of said second curvature.

3. Apparatus as recited in claim 1 and further including means for independently varying the radius of said first and second curved paths for independently varying the radius of said first and second curvatures to be generated on said toric surface.

4. Apparatus as recited in claim 1 wherein said apparatus further includes means for coupling said first drive means to said tool support means for sweeping said tool along said first curved path.

5. Apparatus as recited in claim 1 wherein said lens support means comprises a parallelogram support mechanism.

6. Apparatus as recited in claim 5 wherein said parallelogram support mechanism includes:
   a. a movable support member;
   b. means for mounting said lens to said support member for movement therewith;
   c. a base;
   d. a pair of linkage means coupling said support member to said base for enabling said support member to be reciprocated back and forth relative to said base; and,
   e. wherein said second drive means comprises means for reciprocating said support member back and forth relative to said base for causing said lens to orbitally oscillate along said second curved path relative to said tool.

7. Apparatus as recited in claim 6 including means for varying the length of said linkage means for varying the radius of said second curved path.

8. Apparatus as recited in claim 7 wherein the length of said linkage means are selected such that the length of said linkage means plus the effective radius of said tool will substantially equal the radius of said second curved path and hence the radius of said second curvature to be generated on said toric surface.

9. Apparatus as recited in claim 1 wherein the peripheral surfacing face of said tool includes first and second grinding portions for sequentially performing first and second grinding operations on said toric surface.

10. A method for generating a toric surface on a lens comprising:
    a. supporting a lens upon which said toric surface is to be generated;
    b. supporting a peripheral surfacing tool adjacent said lens for generating said toric surface thereupon;
    c. transversely sweeping said tool and said lens relative to one another along a first curved path having a radius substantially equal to the radius of the curvature to be generated in the direction of a first major meridian of said toric surface; and,
    d. simultaneously transversely oscillating said lens relative to said tool in an orbital manner along a second curved path perpendicular to said first curved path and having a radius substantially equal to the curvature to be generated in the direction of a second major meridian of said toric surface.

11. Method as recited in claim 10 including the further step of varying the radius of said second curved path for varying the radius of the curvature to be generated in the direction of said second major meridian of said lens surface.

* * * * *